United States Patent
Mikhonov et al.

(10) Patent No.: US 12,046,016 B2
(45) Date of Patent: Jul. 23, 2024

(54) DIVISION OF IMAGES INTO SEPARATE COLOR LAYERS

(71) Applicant: ABBYY Development Inc., Dover, DE (US)

(72) Inventors: Vadim Mikhonov, Astrakhan (RU); Ivan Zagaynov, Dolgoprudniy (RU)

(73) Assignee: ABBYY Development Inc., Dover, DE (US)

( * ) Notice: Subject to any disclaimer, the term of this patent is extended or adjusted under 35 U.S.C. 154(b) by 0 days.

(21) Appl. No.: 17/546,652

(22) Filed: Dec. 9, 2021

(65) Prior Publication Data
US 2023/0186592 A1   Jun. 15, 2023

(30) Foreign Application Priority Data

Dec. 9, 2021 (RU) ............................ RU2021136357

(51) Int. Cl.
*G06V 30/41* (2022.01)
*G06V 10/26* (2022.01)
(Continued)

(52) U.S. Cl.
CPC ............. *G06V 10/56* (2022.01); *G06V 10/26* (2022.01); *G06V 10/28* (2022.01); *G06V 10/457* (2022.01); *G06V 10/763* (2022.01); *G06V 30/41* (2022.01)

(58) Field of Classification Search
CPC ........ G06V 10/56; G06V 10/26; G06V 10/28; G06V 10/457; G06V 10/763; G06V 30/41;
(Continued)

(56) References Cited

U.S. PATENT DOCUMENTS

| 6,865,290 B2 * | 3/2005 | Kohchi ............... G06V 30/413 |
| | | 382/173 |
| 8,571,317 B2 | 10/2013 | Welling et al. |

(Continued)

FOREIGN PATENT DOCUMENTS

| EP | 618545 B1 | 5/2002 |
| RU | 2603495 C1 | 11/2016 |

OTHER PUBLICATIONS

Berger, Charles E.H. Berger, et al, "Color Separation in Forensic Image Processing", 2006, 9 pages.
(Continued)

*Primary Examiner* — Molly Wilburn
*Assistant Examiner* — Ahmed A Nasher
(74) *Attorney, Agent, or Firm* — LOWENSTEIN SANDLER LLP

(57) ABSTRACT

A method of the disclosure includes receiving, by a processing device, a document image, dividing the document image into a plurality of patches and determining, for each patch, whether the patch is monochromatic or polychromatic. It further includes clusterizing a plurality of monochromatic patches into a plurality of clusters within a color space, wherein each cluster corresponds to a color layer of a plurality of color layers of the document image, and segmenting each polychromatic patch into a corresponding plurality of monochromatic segments. The method also includes, for each polychromatic patch, associating each monochromatic segment of the corresponding plurality of monochromatic segments with a cluster of the plurality of clusters, and utilizing the plurality of clusters for performing an information extraction task on the document image.

19 Claims, 10 Drawing Sheets

(51) Int. Cl.
*G06V 10/28* (2022.01)
*G06V 10/44* (2022.01)
*G06V 10/56* (2022.01)
*G06V 10/762* (2022.01)

(58) Field of Classification Search
CPC ...... G06V 30/40; G06V 30/10; G06V 30/412; G06V 30/413; G06V 30/153; G06T 2219/2012; G06T 2207/10024; G06T 2207/30176; G06T 5/003
See application file for complete search history.

(56) References Cited

U.S. PATENT DOCUMENTS

| | | | |
|---|---|---|---|
| 8,593,478 B2 | 11/2013 | OBrien-Strain et al. | |
| 11,087,123 B2 | 8/2021 | Hatoun | |
| 2012/0092359 A1* | 4/2012 | O'Brien-Strain | H04N 1/6041 345/589 |
| 2015/0016718 A1* | 1/2015 | Wolk | G06V 30/413 382/165 |
| 2016/0371543 A1* | 12/2016 | Smirnov | G06V 30/413 |
| 2021/0192695 A1* | 6/2021 | Kosaka | G06T 7/187 |
| 2021/0224969 A1 | 7/2021 | Zagaynov et al. | |
| 2022/0122218 A1* | 4/2022 | Yoon | G06T 3/40 |
| 2022/0180113 A1* | 6/2022 | Patel | G06V 10/28 |

OTHER PUBLICATIONS

Bres, Pages Stéphane, et al, "Semi Automatic Color Segmentation of Document", Sep. 25, 2016, 4 pages.

Kessi, Louisa, et al, Université de Lyon, "ACoIDSS: Robust Unsupervised Automatic Color Segmentation System for Noisy Heterogeneous Document Images", 2015, 14 pages.

Abbyy, "Visual enhancement for document photos", https://habr.com/ru/company/abbyy/blog/218285/, Apr. 7, 2014, 50 pages.

Statistical area of fusion, wikiwand, "Merge Statistical Area", https://ru.knowledgr.com/18933844/%D0%A1%D1%82%D0%B0%D1%82%D0%B8%D1%81%D1%82%D0%B8%D1%87%D0%B5%D1%81%D0%BA%D0%B0%D1%8F%D0%9E%D0%B1%D0%BB%D0%B0%D1%81%D1%82%D1%80%D0%A1%D0%BB%D0%B8%D1%8F%D0%BD%D0%B8%D1%8F, 5 pages, [retrieved from the internet on: Dec. 9, 2021].

Scikit-Image, "Niblack and Sauvola Thresholding", https://scikit-image.org/docs/dev/auto_examples/segmentation/plot_niblack_sauvola.html, 2 pages, [retreived from the internet on: Dec. 9, 2021].

* cited by examiner

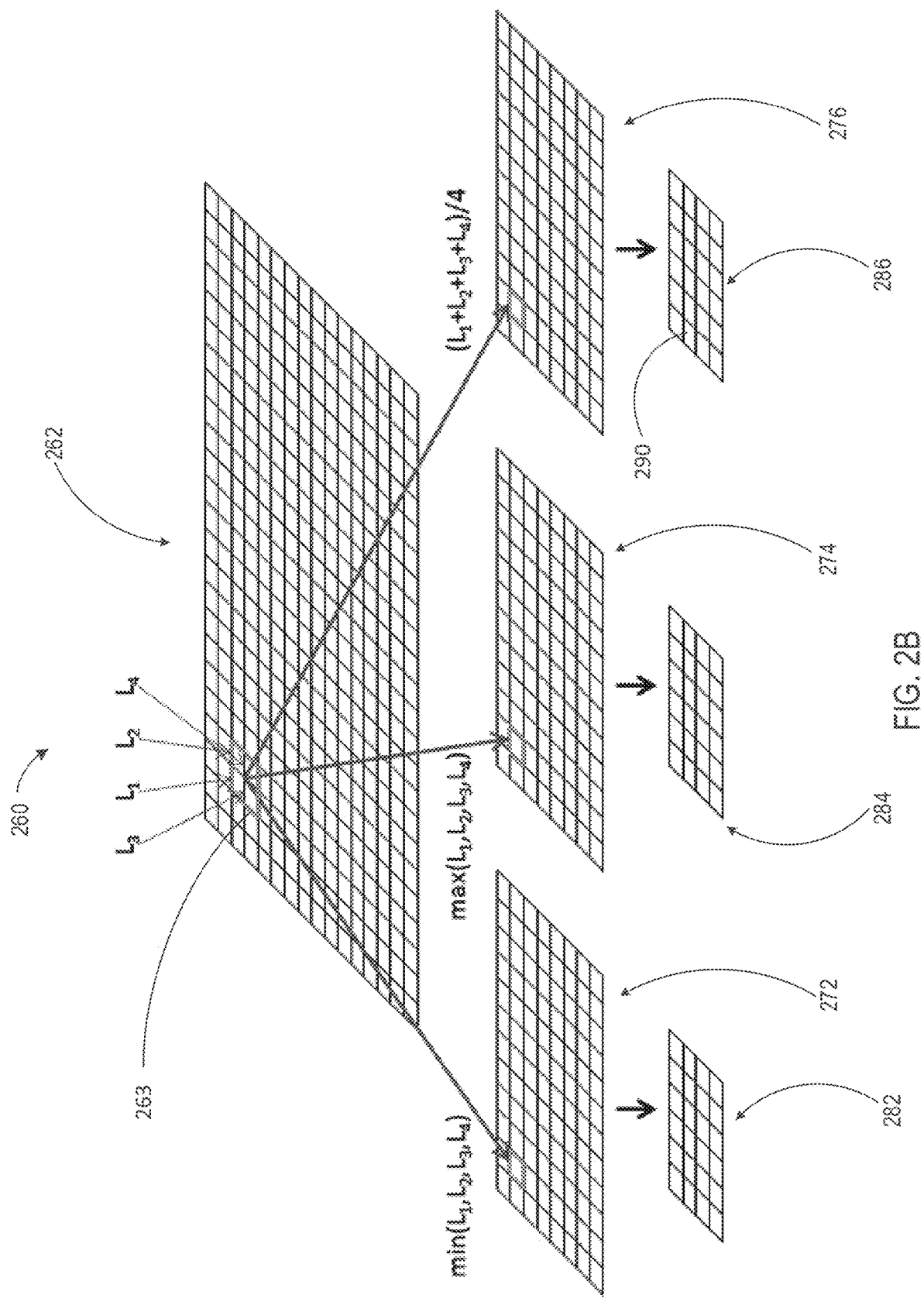

DIVISION OF IMAGES INTO SEPARATE COLOR LAYERS

RELATED APPLICATIONS

This application claims the benefit of priority under 35 USC 119 to Russian patent application No. RU2021136357, filed on Dec. 9, 2021.

TECHNICAL FIELD

The implementations of the disclosure relate generally to computer systems and, more specifically, to systems and methods for image processing. In particular the implementations of the disclosure concern the division of an image into separate color layers for subsequent image processing and for extracting information from the layers.

BACKGROUND

Activities involving document and image processing often lead to encounters with images of documents containing more than one layer of information recorded. For example, in the present day, documents and images that contain additional objects such as stamps, imprints, separators and other information in addition to text continue to become ever more prevalent. In these types of documents and images a challenge may arise with respect to Optical Character Recognition (OCR) when stamps (or other objects) are located on top of and overlapping with text. Thus, the presence of these objects containing information that is layered on top of other objects or text that was already on the surface of the document or image can interfere with an OCR process and lower its quality and accuracy (e.g., a stamp on a higher layer of an image on top of text on a lower layer of the image).

SUMMARY OF THE DISCLOSURE

Implementations of the present disclosure describe mechanisms for dividing a document image into separate color layers.

A method of the disclosure includes receiving, by a processing device, a document image, dividing the document image into a plurality of patches and determining, for each patch, whether the patch is monochromatic or polychromatic. It further includes clusterizing a plurality of monochromatic patches into a plurality of clusters within a color space, wherein each cluster corresponds to a color layer of a plurality of color layers of the document image, and segmenting each polychromatic patch into a corresponding plurality of monochromatic segments. The method also includes, for each polychromatic patch, associating each monochromatic segment of the corresponding plurality of monochromatic segments with a cluster of the plurality of clusters, and utilizing the plurality of clusters for performing an information extraction task on the document image.

A system of the disclosure includes a memory, and a processor coupled to the memory, the processor configured to receive a document image, divide the document image into a plurality of patches, and determine, for each patch, whether the patch is monochromatic or polychromatic. The processor is further configured to clusterize a plurality of monochromatic patches into a plurality of clusters within a color space, wherein each cluster corresponds to a color layer of a plurality of color layers of the document image, and segment each polychromatic patch into a corresponding plurality of monochromatic segments. It is also configured to, for each polychromatic patch, associate each monochromatic segment of the corresponding plurality of monochromatic segments with a cluster of the plurality of clusters, and utilize the plurality of clusters for performing an information extraction task on the document image.

A non-transitory machine-readable storage medium of the disclosure includes instructions that, when accessed by a processing device, cause the processing device to receive a document image, divide the document image into a plurality of patches, and determine, for each patch, whether the patch is monochromatic or polychromatic. The instructions further cause the processing device to clusterize a plurality of monochromatic patches into a plurality of clusters within a color space, wherein each cluster corresponds to a color layer of a plurality of color layers of the document image, and segment each polychromatic patch into a corresponding plurality of monochromatic segments. They also cause the processing device to, for each polychromatic patch, associate each monochromatic segment of the corresponding plurality of monochromatic segments with a cluster of the plurality of clusters, and utilize the plurality of clusters for performing an information extraction task on the document image.

These and other elements and features will become more clear in the following detailed description of illustrative implementations and embodiments of the disclosure, which is to be read in connection with the accompanying drawings.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 2B illustrates an example threshold map generation diagram, in accordance with some implementations of the present disclosure.

DETAILED DESCRIPTION

Figure 1:
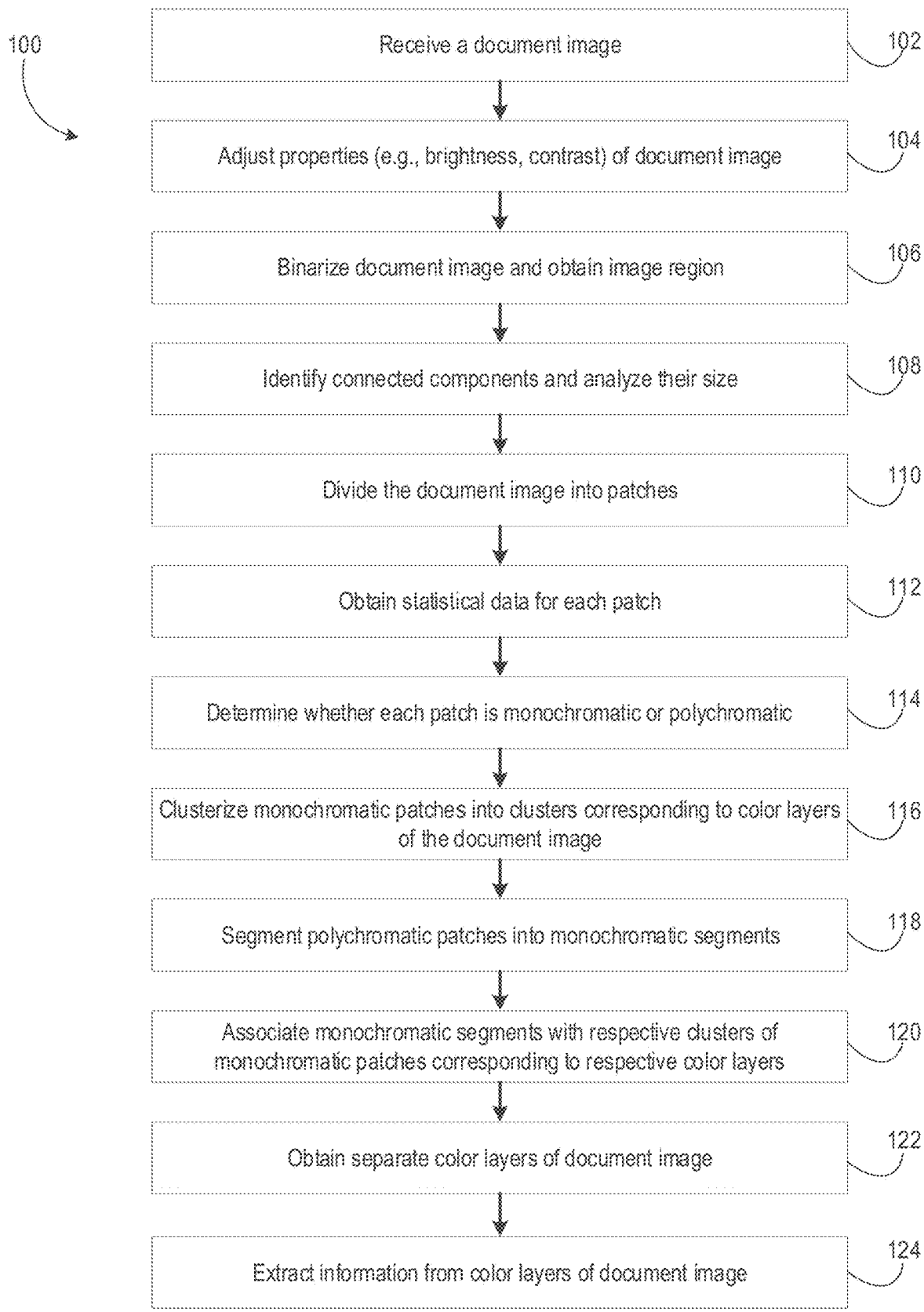
FIG. 1 is a flow diagram of a method of dividing a document image into separate color layers for information extraction in accordance with an implementation of the present disclosure.

Described herein are methods and systems for dividing a document image into separate color layers, which can be utilized for extracting information from the document image. Given the proliferation of documents with multiple layers of information recorded on top of each other (e.g. text entered into a form and then certified with a stamp overlaid on top of the text and the form field) a difficulty has arisen for performance of Optical Character Recognition (OCR) tasks. In documents where multiple layers of information such as text and objects overlap or are overlaid on top of each other, the level of quality and accuracy of OCR operations is significantly reduced.

In situations where documents contain multiple layers of overlaid information, different types of information may be expressed by indicia of different colors within the document image. For example, form documents can be fillable forms with various fields and field labels with instructions for completing the forms as well as separators and other dividing elements defining the fillable fields. Some colored form documents (e.g. color dropout forms) where the fields, instructions, field dividers and other elements can be present in one color while the text or other information entered or filled into the form and its respective fields are present in a different color (i.e., the entries of the fields are in a different color than the remainder of the form document). However, in some situations, the entered text or information can intersect with the dividing elements (e.g., the separators between form fields) of the form document as well as the fields and instructional text of the form document. Similarly, stamps or signatures that are applied to the document after it is filled in can also overlap with both the information entered into the form document and the fields and elements of the form document itself. In these situations character recognition becomes significantly more difficult as the overlapping elements interfere with the OCR process.

Aspects and implementations of the instant disclosure address the aforementioned drawbacks and challenges of existing technology and present novel approaches and mechanisms for dividing a document image into multiple color layers for subsequently performing more accurate and more effective OCR other information extraction operations.

Notably, it may be the case that, for the purposes of OCR or information extraction, the information from different layers of a document may not be equally important. For example, it may be necessary to obtain the information contained in only one of the layers of the document image. Quite often, the desired information is reflected on the document image in one color or multiple colors that are visually similar to each other. In such cases, it is sufficient to divide the document image into separate color layers to be able to perform OCR on the color layer that contains the desired information.

On the other hand, in other situations, it may be desirable to extract information contained in several layers of a document image. In these cases it is significantly easier and more effective to perform OCR or other information extraction operations separately from each layer. Elements of the document image along with their coordinates on the document image can be used for associating entries of fields with the field labels (e.g., to identify to which field or category the information contained in a given element is related). Such associations are especially useful for extracting structured information from documents.

As used herein the term "document" may refer to any type of document including, for example, invoices, identification documents, checks, credit applications, bank documents, agreements, single or multi-page documents, bills of lading, deeds, accounting documents, financial statements, patents, patent search reports as well as any other documents that can often be found in the custody of enterprises in paper or scanned form.

FIG. 1 shows a flow diagram of a method 100 of dividing a document image into separate color layers for information extraction in accordance with an implementation of the present disclosure. In general, the operations described herein can include several processes including receiving or retrieving a document image at block 102 and performing adjustments of its visual properties such as equalizing brightness, modifying contrast at block 104, and binarizing it at block 106. Further, the implementations of the present disclosure can include finding connected components at block 108, dividing the document image into patches at block 110, and calculating statistics, at block 112, for each of the patches so that the patches can then be classified as either monochromatic or polychromatic (i.e., non-monochromatic), at block 114, and clusterized at block 116. In some implementations the clusterization can be based on a calculation of the centroids of the clusters in color space which can correspond to a color layer of the document image. The clusterization of the patches can be performed initially for the monochromatic patches and the polychromatic patches can be segmented, at block 118, into monochromatic segments each of which can then be associated, at block 120, with a corresponding cluster. In this manner, separate color layers of the document image, each corresponding to a different cluster of monochromatic patches and monochromatic segments of polychromatic patches can be identified, at block 122, in a given input document image. Then, information can be extracted, at block 124, from one or more of the layers of the document image using OCR or other information extraction techniques.

The following description explains in detail the features and elements of some of the implementations of the present disclosure focusing on the main aspects of dividing a document image into separate color layers for subsequent processing and analysis. In some implementations a method for extracting information from a document image can include receiving one or more document images. The document images can be received from a device (e.g., a camera or a scanner) capable of recording a digital copy of a document from a physical copy. In some embodiments the document images can be retrieved from a digital storage location.

Figure 2A:
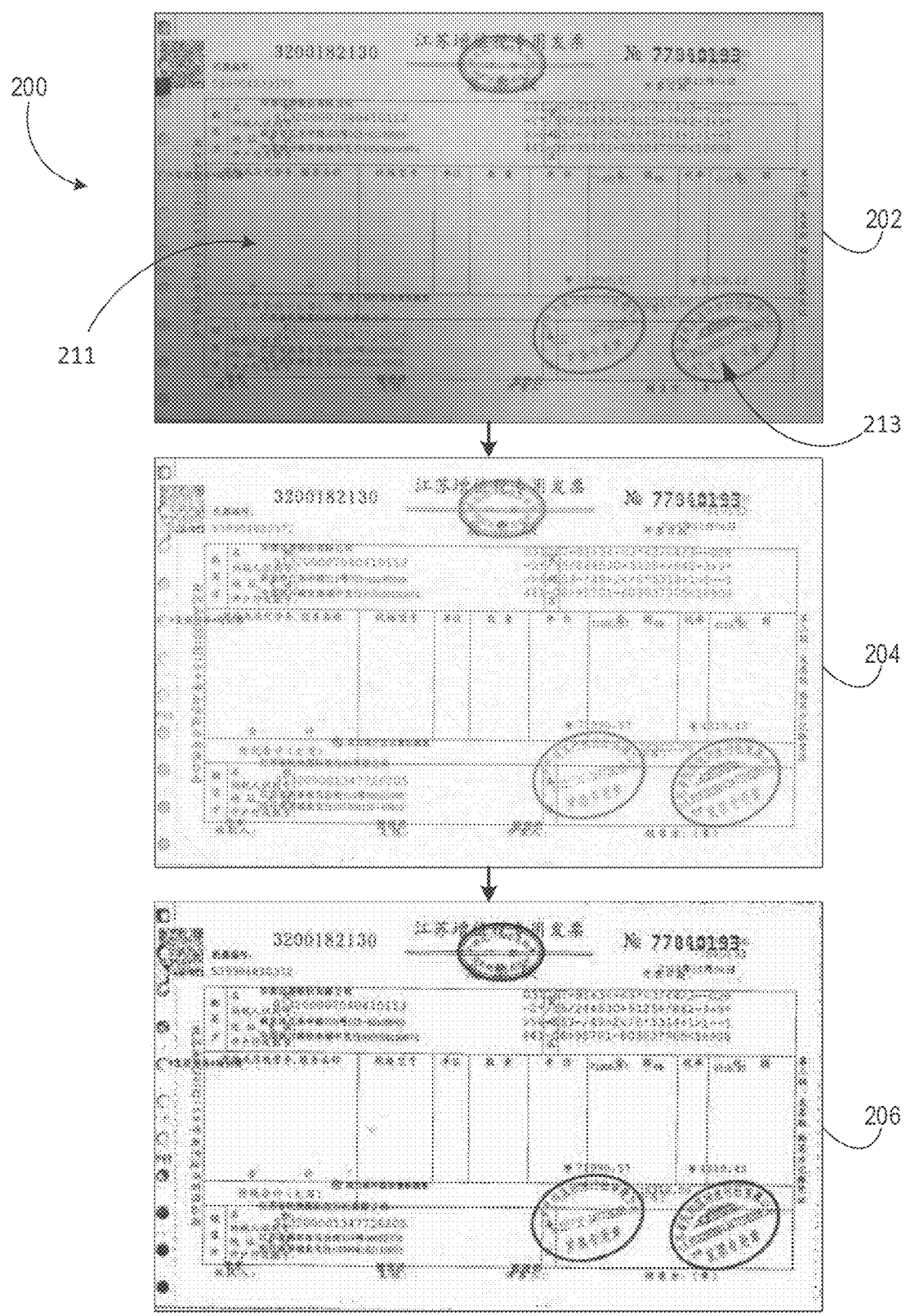
FIG. 2A illustrates an example series of document property adjustments, in accordance with some implementations of the present disclosure.

FIG. 2 illustrate an example series of document property adjustments, in accordance with some implementations of the present disclosure. Document image 202 shows the state of the image as it is received, while document image 204 and document image 206 show the state of the image after property adjustment and binarization respectively. In some implementations the documents can be colored form documents 202 containing entries in the form fields 211 overlaid with stamps 213. This type of structure is can often be seen in receipt and invoice documents. Notably, while the following description will focus on an implementation involving a single one-page document, the various aspects of the implementations described herein can be equally applicable to sets of multiple documents and multipage documents.

Thus, in some implementations, the visual properties of the received document image 202 can be adjusted. This includes performing an equalization of the brightness of the document image 202. More specifically, the brightness of the document image 202 is modified so that areas of the document image that should appear white but do not, such as form field 211, due to unequal lighting, are made to appear as true white. This can be achieved in a variety of ways including the use of digital and electronic filters.

The unevenness (i.e., the gradual transitions from darker regions to lighter regions, the smooth gradients of brightness change) is represented by a low signal frequency (i.e., low frequency of brightness signal change). In contrast, the substantive content of the document image 202 (e.g., the text, stamps, form elements, separators, etc.) is represented by a high signal frequency (i.e., the brightness signal frequently changes in magnitude since there are many closely spaced areas of alternating dark and light areas). Accordingly, a goal of the brightness equalization process is to remove or compensate for the low frequency component of the image and thereby equalize the brightness over the entire image. In this manner, the brightness of the elements located in the more poorly illuminated areas of the document image will also be adjusted.

In the various implementations, a variety of filters can be used to filter out the high frequency components from the low frequency components of the image 202 (e.g., a median filter, a high-pass filter, a Gaussian blur filter, a bilateral filter, etc.). After applying the filter (e.g., a median filter) the high frequency objects/elements such as text, separators, and other small details in the document image will be removed. At the output of the filter an intermediate image can be obtained that contains only the gradual changes in illumination (i.e., information regarding the changes in brightness). Thus, in some embodiments, a filter can be applied to remove small detailed elements from a document image 202 so that only the background along with any relatively gradual changes in brightness remains. The high frequency components removed by the filter can subsequently be recovered since they are precisely the components that can be used for OCR and information extraction.

In some implementations, depending on the type of filter being used, it can be beneficial to use a larger filter radius rather than a smaller one wherever the option is available. However, in other implementation other methods of optimizing the filtering can be performed for increasing the speed and accuracy of the filtration. For example, the size of the document image 202 can be initially reduced prior to the application of the filter. Thereafter, the filter can be applied with a smaller radius (i.e., since the image is smaller) and then the intermediate image resulting after the application of the filter can be returned to its original size.

The following describes the modification of the brightness property of the image after the application of the aforementioned filter to the document image 202. If I is the initial brightness of a channel (e.g., a Red-Green-Blue (RGB) channel) of the initial document image 202, then after filtering the remaining component of brightness (i.e., the brightness of the same channel in the intermediate image obtained after the application of the filter) can be defined as I'. Accordingly, the image can be adjusted by normalizing the low frequency signal. For example, in some embodiments, for each channel the brightness is calculated according to the formula $I_{new}=I/I'$. Thus, the brightness of the initial image 202 is divided by the brightness component obtained after the application of the filter to obtain a new brightness $I_{new}$ that is equalized across the entirety of the image 204 and does not contain gradations of intensity illumination while still maintaining detailed elements such as text, stamps, separators etc. (which can be important elements for subsequent OCR and information extraction). The equalization of brightness makes previously darker areas of the initial image 202 brighter and previously lighter areas of the image darker to even out the intensity of illumination across the entire image 204.

The method of equalizing the brightness described above is related to documents with a light or white background which is commonly found. Accordingly, the background color is adjusted across the entirety of the image so that the background color corresponds to true white and the remaining colors of the image are normalized accordingly. However, an analogous process can be performed with documents that have a dark background (i.e., documents where light colored text and other information is presented on a black or dark background). In these cases, color inversion is initially performed on the original image in order to bring it into standard presentation of having a dark text and other information on a light background. Thereafter the aforementioned brightness adjustment and equalization process can be performed as described.

In some implementations, the contrast of the image can also be adjusted. There are various algorithms for modifying the contrast of an image that can be applied for the purposes of improving a clear delineation of the various substantive elements of a document image. However, algorithms that take unevenness of illumination can be more beneficial than others. In one implementation, an adaptive increase of contrast relative to a local average value can be applied. This is applicable to documents with relatively simple layouts. In one implementation, a scrolling Gaussian window (e.g., a window with blurry/fuzzy edges with gradually decreasing weights in the direction away from the center) can be applied across the image to increase contrast adaptively in different areas of the image.

For documents with more complex layouts, such an adaptive binarization algorithm can generate a threshold map, through an iterative pyramidal process depicted in FIG. 2B, relative to which an increase in contrast results in an improvement of visual quality. Accordingly, in these implementations, an iterative decomposition process is applied to an image to generate a threshold map. For example, in one implementation the decomposition can start at the scale of the original image 262. The image can be divided into non-intersecting units 263 of a uniform predetermined size (e.g., 2×2 pixel squares, 3×3 pixel squares, etc.). For each of the units 263 (e.g., pixel squares) the values of the minimum, maximum, and average brightness of the pixels that make up the unit can be determined (e.g., for a 2×2 square the brightness of the 4 constituent pixels can be determined). From these values, three images can be formed: (i) an image 272 containing the minimum values, (ii) an image 274 containing the maximum values, and (iii) an image 276 containing the average values, each of which will be two times smaller horizontally and vertically relative to the original (or preceding) image. This procedure can be repeated to lay out the resulting images in a pyramidal structure 260 until a level is reached at which the size of the resulting image 282, 284, 286 no less than desired minimum size (e.g., 2×2 pixels).

Thus in some embodiments, using the above-described pyramidal decomposition 260, the values of minima, maxima, and averages for the original areas of the image are obtained at different scales of its representation. The method for constructing a threshold map based on the pyramidal decomposition can be a multi-stage process. At the bottom level 282, 284, 286 of the pyramidal decomposition, where the image consists of only a few pixels, a threshold map can be generated using one of two of the following values: (a) the local average value of pixel brightness of this region of the image (i.e. the brightness of a pixel from the image generated from the image 276 containing the average values in the pyramid), or (b) the average value between the local minimum and maximum (i.e., the average of the brightness of an equivalent number (e.g. 2) of pixels taken from the image 272 formed from the minimum values in the pyramid and pixels taken from the image 274 formed from the maximum values in the pyramid). Then at the next level of decomposition, the threshold map can be expanded by a factor of 2 both horizontally and vertically using interpolation with convolutions [1 3], [3 1].

For each pixel, at each subsequent level of pyramidal decomposition 260, the difference between the pixel value from the image 272 formed from the minimum values in the pyramid and image formed from the maximum 276 values in the pyramid can be calculated. If this difference does not exceed a predetermined threshold value (e.g., a predetermined noise threshold value below which information is considered to be insignificant noise), it can be assumed that there is no useful signal in this area of the image, both at this and at subsequent levels of the pyramidal decomposition 260. Therefore, the threshold value obtained at the previous level of decomposition can be left unchanged. Otherwise, if the exceed a predetermined threshold value, a new refined threshold value can be calculated based on a combination of (a) and (b) above.

The aforementioned procedure can be repeated until such a level of decomposition is reached, at which the image areas 290 corresponding to the pixels in the pyramid are still larger than the smallest elements (e.g., letters, symbols, numbers etc.) visible in the image. This results in a threshold map relative to which an increase in contrast does not lead to the loss or removal of objects of different sizes and where homogeneous areas in the image are free from noise. Accordingly, the threshold map is used to increase contrast such that the areas within each window where the brightness is above a threshold value have their brightness increased while areas within each window where the brightness is below a threshold value have their brightness decreased to more clearly define the various elements of the document image. In other implementations, for colorful images, the contrast can be increased for the brightness component (i.e., for the grayscale component of the image), while decreasing the coefficient of contrast increase for areas of the image that are saturated with color.

In some implementations, the document image can be binarized to create a black and white image 206. The process of binarization is a transformation of a colorful or grayscale image into a binary black-and-white image 206. As described in more detail below, the binarization process can be performed according to various methods such as, for example, Otsu's method (i.e., global binarization) and local adaptive binarizations (e.g., Niblack and Sauvola Thresholding). One of the main parameters of this transformation is a threshold value t with which the brightness/intensity of each pixel is compared. After the comparison, by determining whether the brightness of a given pixel is lower or higher than the threshold value t, the pixel is respectively assigned a value of 0 or a 1.

The binarized image 206 can be represented in the form of a region represented by a data structure where the region which corresponds to are having the maximum values (i.e., 1's) within the data structure. Accordingly the region can be considered to be all of the black portions of a binarized image containing all the text, objects, dividers etc. (i.e., the significant objects of the image). In other words, the region is a mask of significant elements present on the document image. This mask contains the elements that can be used for subsequent OCR and information extraction. Notably, the aforementioned binarization process can further be used to obtain masks for each color layer of the image as well. For example, white pixels in the binarized document image can be automatically associated with the background layer across all channels. Accordingly, after binarization, the image 206 can be divided into two classes of pixels: background pixels and pixels belonging to objects/elements of the document image.

Figure 3:
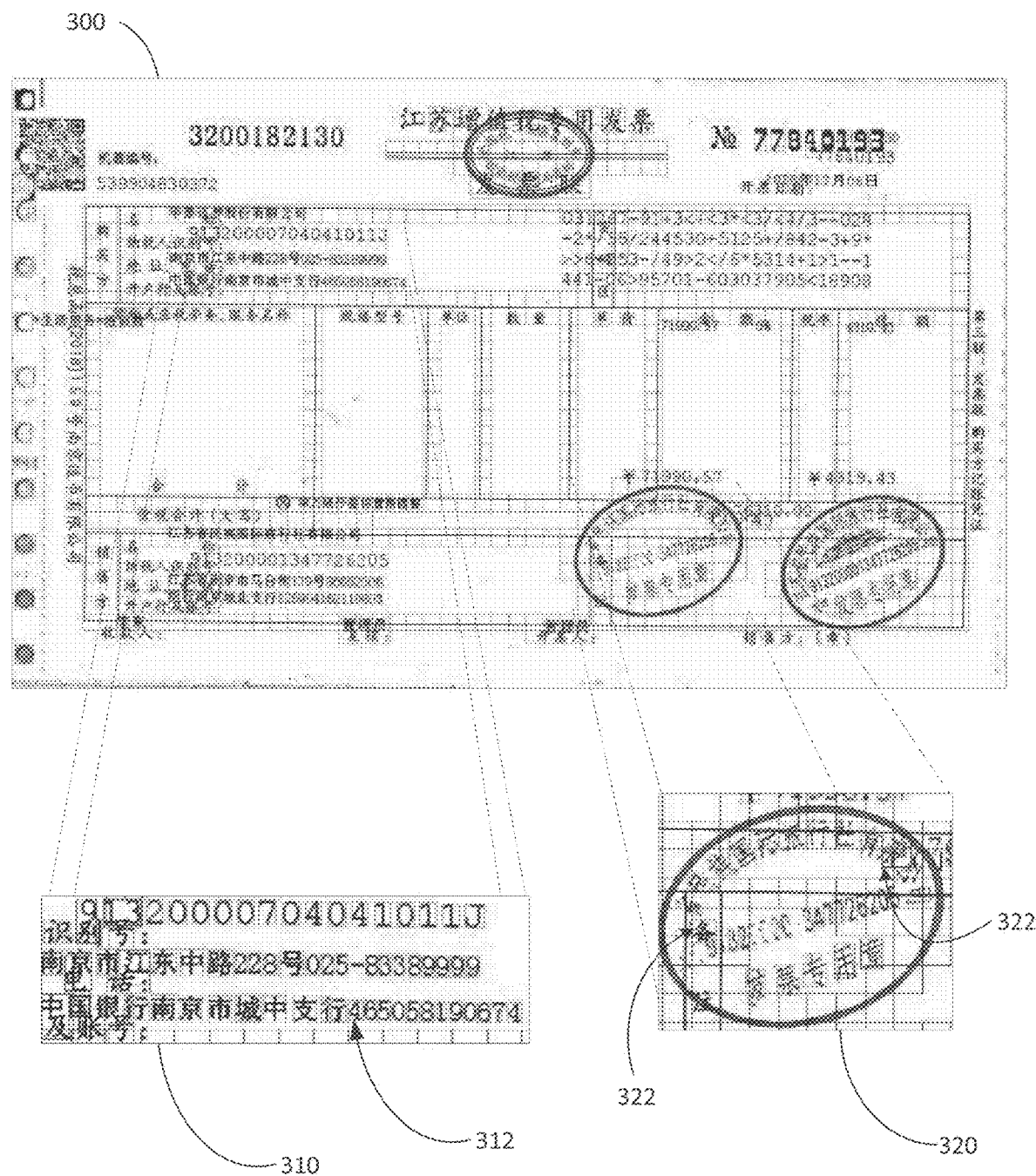
FIG. 3 is a diagram of an example document image divided into patches, in accordance with some implementations of the present disclosure.

In some implementations, connected components can be detected within the document image and analyzed. In these implementations, the connected components are detected from the binarized document image after which they can be analyzed to determine their respective sizes. The detection and analysis of connected components can facilitate the division of the image into patches as seen in FIG. 3. A connected component is an object the pixels of which are adjacent to neighboring pixels. Connectedness can be defined by adjacency to other pixels in either four directions (e.g., left, right, up, down) or in either of eight directions if an additional four diagonal directions are considered as possible connections between the initial four. In the case that a pair of pixels do not have any neighboring connected pixels between them, it can be determined that the pixels belong to different connected components. For example the number "12" includes two separate connected components "1" and "2" while the letter "B" is formed from a single connected component. Accordingly, if elements on the binarized document image overlap, intersect, merge, touch, or otherwise connect to each other in any way, they can be considered to be part of a single connected component.

Then, in some embodiments, the size of the identified connected components can be determined on the basis of which a particular size of a corresponding patch will be determined for dividing the document image. A patch can be understood to be a non-intersecting rectangular region that contains a connected component. Patches can be sized to be the same size or slightly larger than their corresponding connected component so that each patch completely encompasses a respective connected component. Accordingly, in one implementation each connected component can be encompassed by a distinct separate patch. In this implementation, a smaller patch encompassing a small connected component can be contained within a larger patch encompassing a larger connected component. For example, document image 300 is shown to have been divided into various patches of different sizes. Region 310 contains connected elements entirely contained by patches 312.

In another implementation, the sizes of the various connected components of the document image can be clusterized into a predetermined number of clusters and the average size of a connected component in the most representative cluster (i.e., the cluster with the largest number of elements) can be selected as representative of a size of a patch. In this implementation, the connected components can be covered with patches of the representative size such that all connected components are covered/encompassed by at least one patch and if a single patch does not encompass a given connected component, it is covered with multiple non-intersecting patches.

Thus, the document image is divided into patches containing the connected components. Notably, the patches contain some significant element of the document image and not the exclusively empty/white areas. As a result, a patch 312 can contain elements or pixels of one color or a patch 322 can contain elements and pixels of multiple colors. In order to divide a document image into different color layers, patches 312 containing the same color (monochromatic patches) can be identified and associated with a corresponding color layer. The remaining patches, such as patches 322 in region 320 where connected regions of the stamp overlap with connected regions of the underlying text and document form elements, will be the non-monochromatic/polychromatic ones which can subsequently be segmented and have their segments associated with a corresponding color later.

Figure 4:
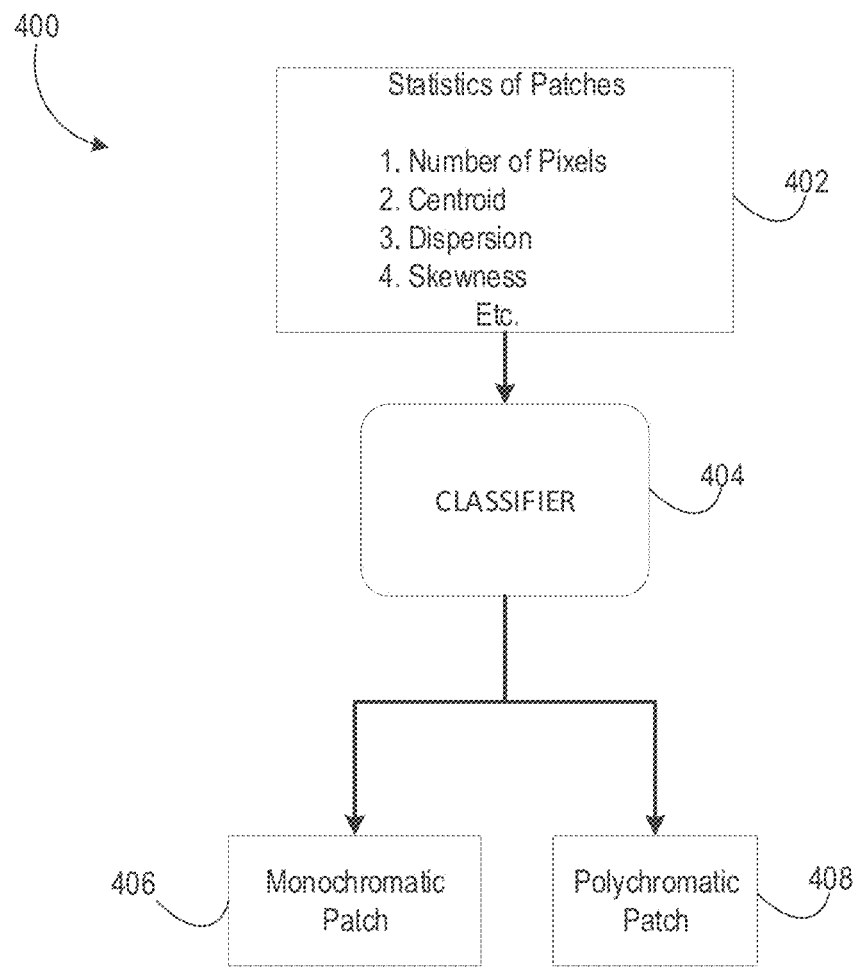
FIG. 4 is a block diagram of a method of classifying patches, in accordance with some implementations of the present disclosure.

To achieve this goal, as depicted in FIG. 4, initially as part of method 400 a calculation of various statistical measures of the collection of patches can be performed at block 402. Thereafter, as described in more detail below, the patches can be classified, at block 404, according to the calculated statistics. For example, in one implementation an adjusted document image (i.e., an image that has undergone brightness leveling and contrast modification) can be transformed from Red-Green-Blue (RGB) space into Hue-Saturation-Value (HSV) space. Further, the cylindrical model of HSV space can be modified by collapsing it along the "Value" axis and converting the coordinates into Cartesian coordinate, then distance between points in the space can be calculated as distance within Euclidean space (i.e., the Euclidean distance≈$\sqrt{(H^2+S^2+cV^2)}$ where H stands for a hue value, S stands for a saturation value, V stands for a brightness value, and c is a coefficient to diminish the importance/weight of the V brightness value and thereby collapse the cylinder along the V axis). This distance calculation, as described in more detail below, can be used for calculating the centroids, distance in color space, as well as other statistical measures for the patches.

Further, in some implementations, for the pixels of each patch a collection of statistical values is evaluated: (i) the number of pixels in the patch, (ii), the centroid (i.e., the average value of the pixels across the three HSV parameters), (iii) dispersion (i.e., of the pixel values relative to the centroid in HSV color space), and (iv) skewness (i.e., along a one-dimensional distance relative to the centroid). Existing standard statistical/mathematical formulas can be used for the calculation of these statistics and can be implemented through executable code.

As noted earlier, the patches into which the document image is divided into can be monochromatic (i.e., containing pixels of only one color) and non-monochromatic/polychromatic (i.e., containing pixels of two or more colors). As used herein, the term non-monochromatic and polychromatic are mutually interchangeable. In one embodiment, patches that contain more than two colors can be treated as patches containing two colors by ignoring the least represented color of the pixels.

Thus, each patch can be classified as either monochromatic 406 or polychromatic 408 using a chromaticity classifier 404. The statistics 402 of the patches (e.g., number of pixels, centroid, dispersion, skewness etc.) can be input into the classifier 404. The chromaticity classifier can be pre-trained on the basis of labeled training images and configured with relevant classification parameters during training. At the output, the classifier produces a decision concerning each patch to determine whether it is monochromatic 406 or polychromatic 408. For the purposes of some of the implementations described herein, any machine-trainable classifier (e.g., a gradient boosting model, a support-vector machine, a linear classifier, etc.) can be used. In other implementations and neural network classifier can be used.

Figure 5:
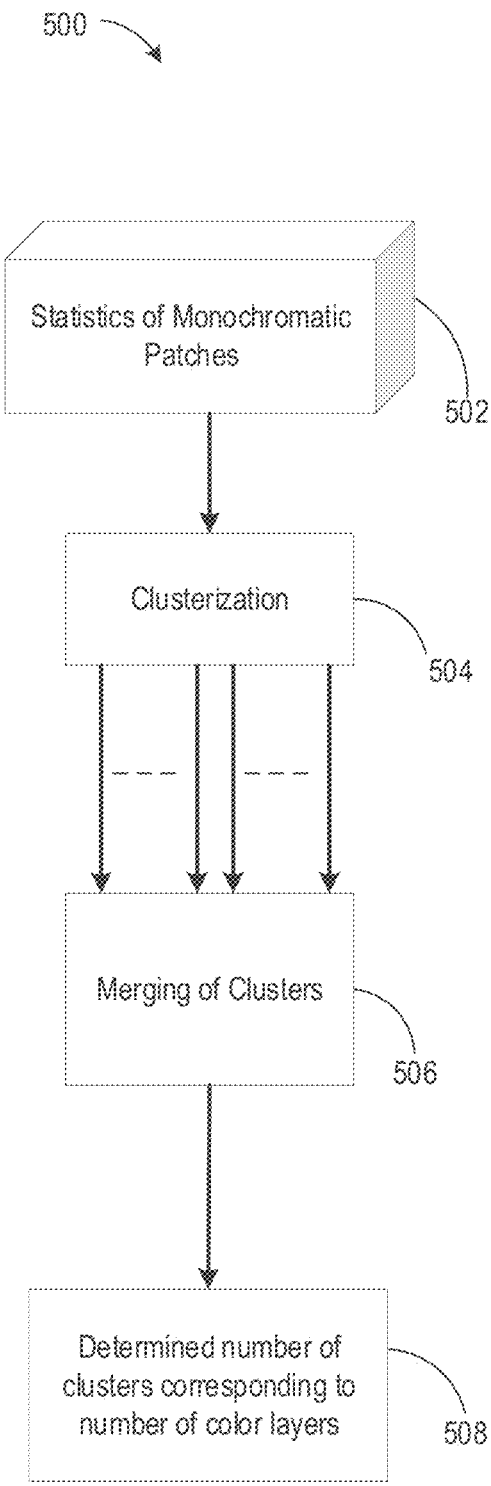
FIG. 5 is a block diagram of clusterizing patches, in accordance with some implementations of the present disclosure.

In some implementations, once the patches are classified as monochromatic and polychromatic, a two-staged method 500 of clusterization, shown in FIG. 5, can be performed to obtain the centroids of the clusters each of which corresponds to a separate color layer of the document image. As described in more detail below, the monochromatic patches can be selected for this process along with their respective statistics, at block 502, and the centroids (i.e., centroids in color space) of each cluster can be calculated.

Initially, the statistics of the monochromatic patches can be grouped into sub-clusters using classical clusterization mechanisms, at block 504, such as k-means clustering, expectation-maximization algorithm clustering, hierarchical clustering and other similar methods. However, at this point, at block 504, a multitude of clusters can be created and can be subject to further refinement. Accordingly, after the first stage of clusterization, at block 504, a very large number of clusters (each corresponding to a different color layer) can be generated so that they can thereafter be merged, at block 506, into a smaller number of clusters.

Accordingly, for each of the sub-clusters a set of merged statistics is calculated. Merged statistics are calculated among all of the possible pairs of sub-clusters to determine the best candidates for merging (e.g., statistical region merging (SRM)). Thus a pairwise calculation of all the possible merger operations is performed. Pairs of sub-clusters can be selected based on the conditions of maximizing the sums of weighted intercluster dispersions and the distance between centroids of the respective clusters. As soon as a pair of sub-clusters is found that generates the best dispersion feature, that pair is merged together into a single cluster. In some implementations, it is beneficial to maximize the distance between the centroids of the final set of clusters. Accordingly, the clusters that are candidates for merging together can be the ones the respective centroids of which have the smallest distance to each other in color space.

Thus, the pairwise merging of cluster is performed until a pre-determined threshold criterion is met (e.g., a pre-determined number of clusters is reached, or a pre-determined sum of weighted intercluster dispersions and the distance between centroids is reached). The pre-determined criterion can be a constant that is pre-set in the clustering mechanism based on training data. Therefore at the output of the merger and the second stage of the clusterization process, several clusters are obtained along with their corresponding statistics. Thus, the resulting particular number of clusters, can be associated, at block 508, to correspond to the set of separate color layers (i.e., channels) of the initial document image. Accordingly, the image can then be divided into a number of layers equal to the number of clusters obtained.

However, while the abovementioned procedure pertains to the monochromatic patches, the polychromatic patches remain to be incorporated into the process. The remaining polychromatic patches (each of which can be reduced to be treated as containing two colors) can each be associated with the clusters formed from the monochromatic patches.

To effectuate this association, a segmentation operations is performed on the polychromatic patches. The polychromatic patches identified by the chromaticity classifier can be segmented into monochromatic segments. In some implementations, each non-monochromatic patch can be divided into two segments (i.e., color channels) and each segment can then be associated with a corresponding color layer (based on the clusters obtained earlier). Similar to that of the clusterization process described above, a centroid (in color space) can be calculated for the pixels of each segment of each non-monochromatic patch.

In some implementations, the segmentations can be performed using a neural network (e.g. convolutional neural network, autoencoder, etc.). The neural network can be trained on synthetic training data or real training data that is pre-labeled according to three color channels, one as a background color and two different color channels for significant objects. In other implementations, other methods that do not employ neural networks can also be used for the purposes of segmentations. For example, segmentation can be performed heuristically or by using standard approaches for color segmentation such as color based region growing segmentation with and without the use of statistical region merging (SRM), Normalized Cuts, and Efficient Graph-Based Image Segmentation.

In some implementations, when the heuristic method of segmentation is used, the image of each non-monochromatic patch is represented in separate channels that can contain color information such as Red, Green, Blue, Saturation, Hue etc. In other implementation other variables/channels of other color spaces can be used. Thus, in one implementation each of four channels (Red, Green, Blue, and Saturation) is binarized using Otsu's method (i.e., using a single intensity threshold that separate pixels into two classes, foreground and background) to obtained binarized masks of each channel/variable. From the binarized masks for each channel, segments of colors are selected which have the lowest Intersection-over-Union (IoU) metric. In other words, for all possible pairs of the binarized masks the IoU metric is calculated and the pair for which the IoU metric is the smallest is selected. Each of the masks can, as described in more detail below, then be associated with a corresponding cluster and image color layer. Thus, in this manner, an image that was divided into patches is represented in four version, wherein each version corresponds to a clearly defined mask of a different color/channel.

In some cases, the segments of the non-monochromatic patches may overlap in certain regions. However, when the centroids of each of the monochromatic segments are calculated the pixels in the area of overlap can be ignored. Thus, the centroids in color space of the segments obtained at this stage can be used to compose the complete separate color layers of the document image.

Accordingly, in some implementations of the present disclosure, the different color layers of the document image can be composed from the aforementioned clusters and segments obtained earlier. At this point the following information is known: (i) information concerning all the monochromatic segments of the non-monochromatic patches and their respective centroids in color space, and (ii) the information concerning the centroids of the clusters of the monochromatic patches corresponding to separate color layers of the document image (obtained after clusterization into, for example, 3-4 or more clusters).

In some implementations, an association of the centroids of each monochromatic segment of the non-monochromatic patches is made with the nearest cluster (i.e., color layer of the document image) based on the Euclidean distance within color space. In other words, on the basis of the centroid of each segment of each match, the segment is associated with one of the previously identified clusters until all the monochromatic segments of the polychromatic patches have been associated with a cluster of polychromatic patches (and their corresponding separate color layer of the document image).

In this manner, the result of some implementations contains separate color layers of the document image where each layer is composed of clusters of monochromatic patches and associated monochromatic segments from polychromatic patches. It should be noted that in some cases, the different color layers can have areas where they intersect (i.e., common areas) which can correspond to the locations where multiple objects or information elements were overlaid on top of each other.

Figure 6:
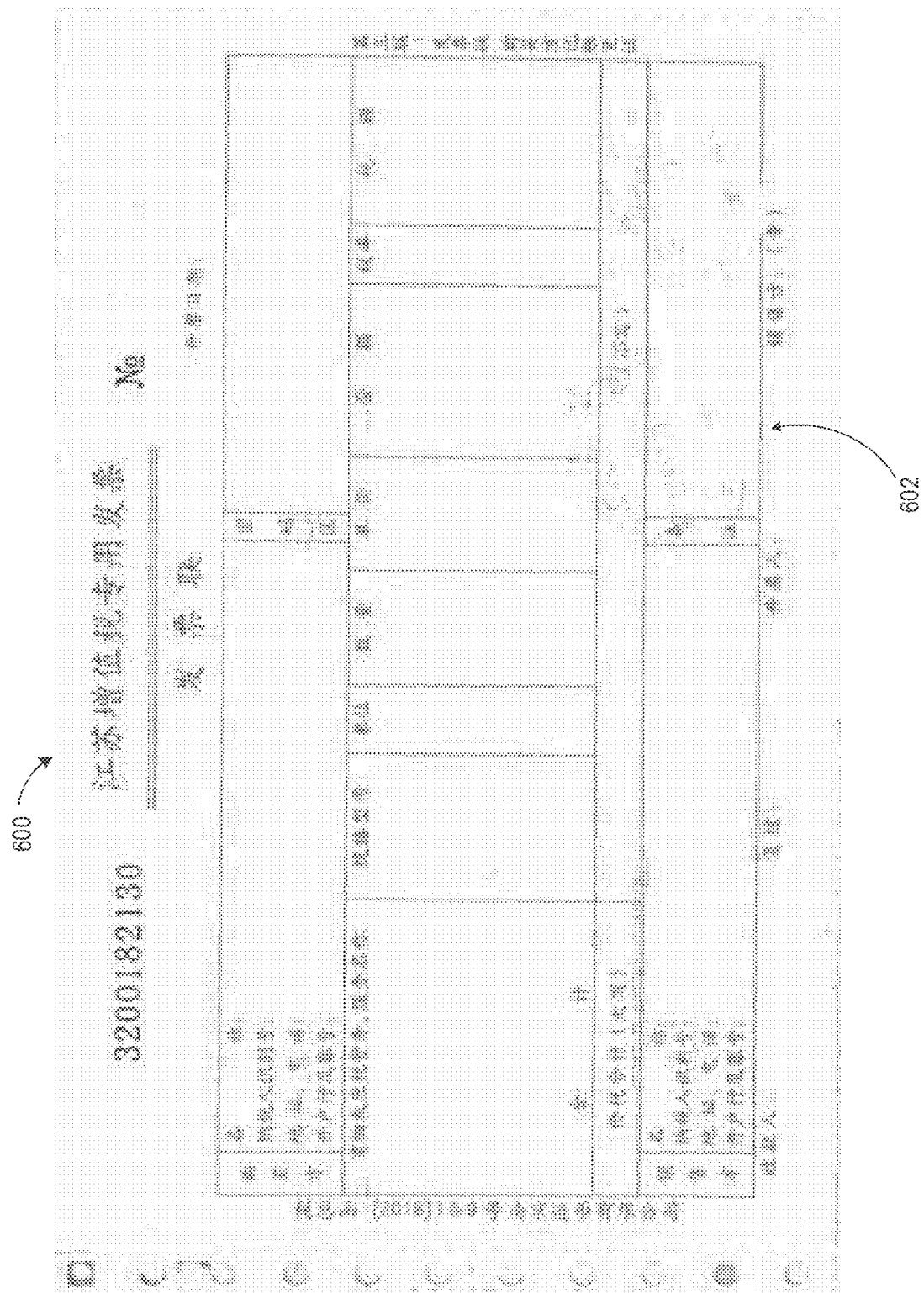
FIG. 6 illustrates a diagram of a color layer of an example document image, in accordance with some implementations of the present disclosure.
Figure 7:
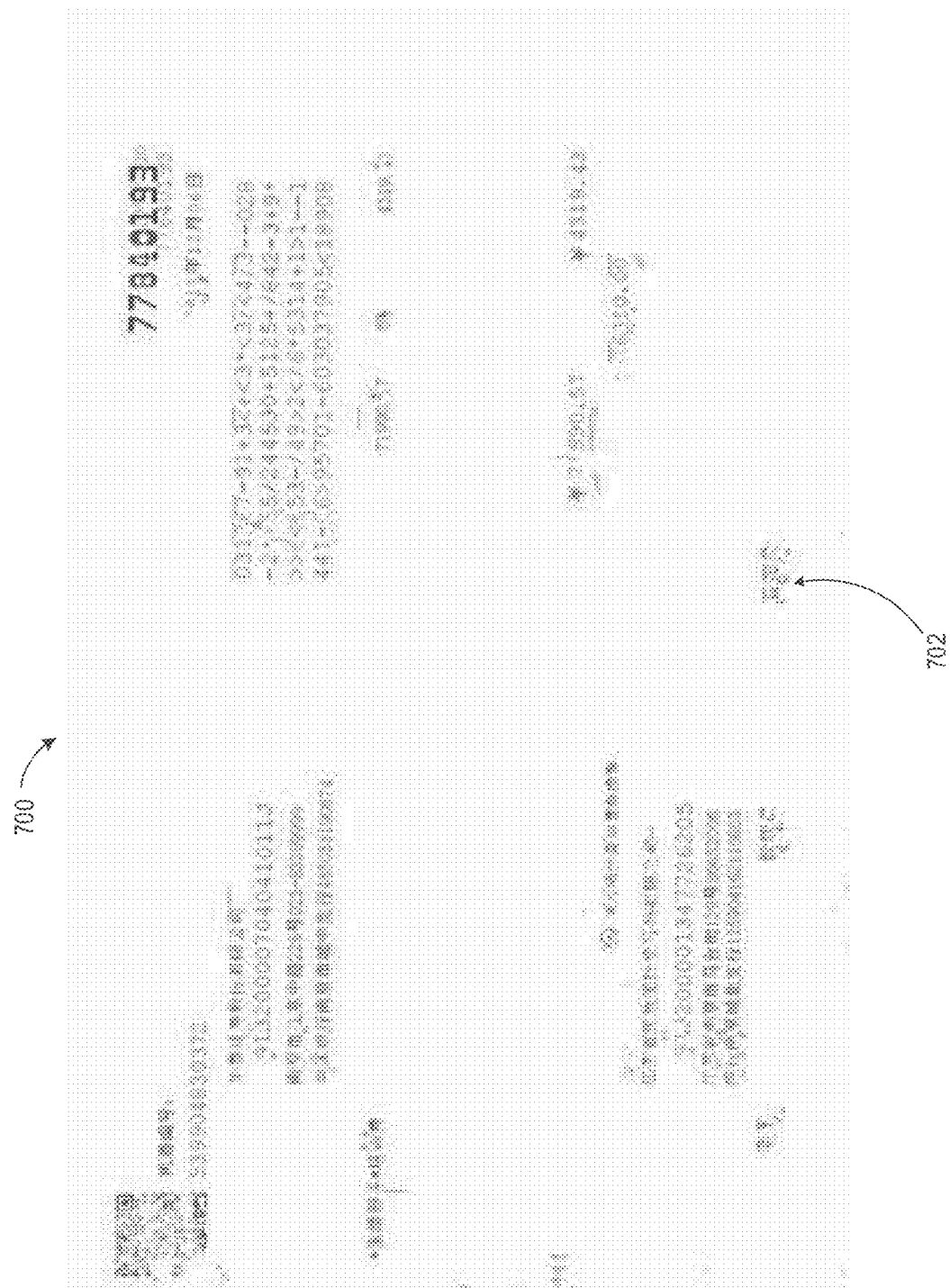
FIG. 7 illustrates a diagram of a color layer of an example document image, in accordance with some implementations of the present disclosure.
Figure 8:
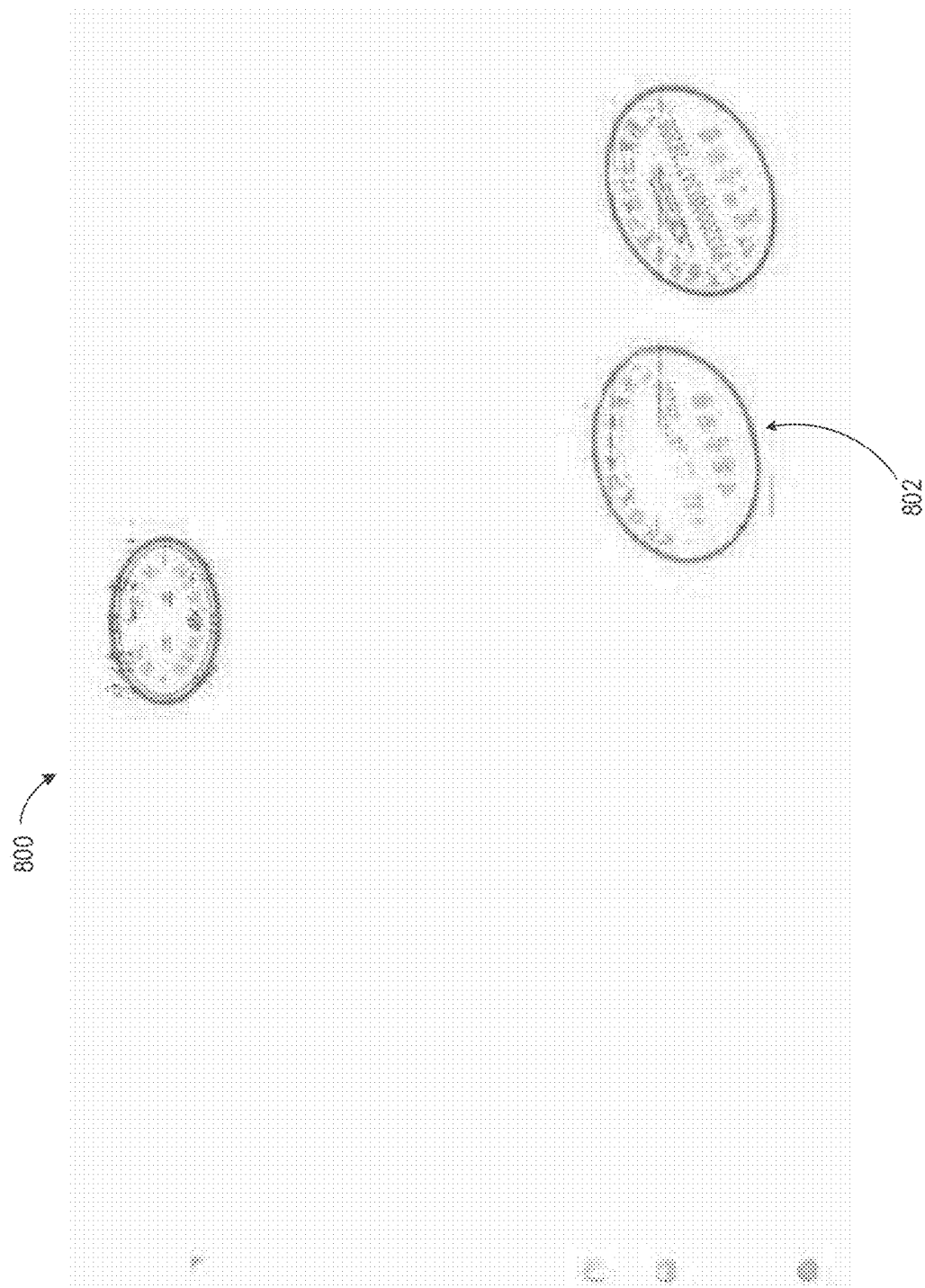
FIG. 8 illustrates a diagram of a color layer of an example document image, in accordance with some implementations of the present disclosure.

Thus, in one implementation, a document, earlier depicted in FIG. 2 can be divided into three separate color layers. FIG. 6 depicts the first color layer 600 containing the information 602 of the fillable document form is depicted in. FIG. 7 depicts the second color layer 700 containing the input information/data 702 filled into the form fields. FIG. 8 depicts the third color layer 800 containing the stamps 802 that were pressed over the form document and input data.

In some implementations various OCR and information extraction tasks can be performed on each of the obtained layers of the document image. For example, each layer comprised of one of the clusters can be subjected to an OCR operation to detect and extract any textual information that it contains. In other examples, the clusters can be used by a neural network to identify and extract information comprised of the elements or fields in the layer containing the unfilled fields and instructions of a fillable form document.

When performing such OCR tasks, it can often be the case that the layer containing the data input into the form fields may be the most substantively important. However, to obtain structured information extracted from the document it can be useful to additionally OCR the layer containing the elements pertaining to the blank form document to be able to relate the input information to their respective corresponding form fields. Furthermore, while in some cases the layer containing the stamps may be of limited importance, in other cases the stamps may contain crucial information related to the data input in the form fields (e.g., attesting to their confirmation, veracity, or acceptance), and therefore it may be useful to OCR the color layer containing the information from the stamps. Based on the coordinates of the information recognized by OCR, the information from each layer can be associated and combined with the information obtained from the other layers and ultimately form a composite document image with detected information ready for subsequent processing and extraction.

In some other embodiments, the document image can be divided into color layers using a different approach. This approach can be roughly divided into four stages: (i) loading/receiving the document image; (ii) adjusting the brightness and contrast of the document image; (iii) clusterization and division of the image into intermediate layers; and (iv) unifying the layers of the image using a classifier of layer unification.

While the first two stages can be performed analogously to those described earlier, the third stage can include taking three primary actions: (a) transforming the image into HSV color space; (b) selecting gray pixels to be associated with a background color, identifying color clusters by generating histograms of pixels of particular color tones, and determining color sectors within HSV color space within pixels are clustered into two clusters which have their centroids calculated; and (c) associating the pixels with layers corresponding with the gray layer and the clusters (i.e., after the centroids of the clusters are calculated, the pixels are associated either with the gray background layer or with the cluster with the nearest centroid in color space. This process can result in several images, each of which can contain a portion of the initial document image in a different color. However, the elements in some of the layers can appear to be blurry. During the fourth stage, the images of the intermediate layers are selectively united to obtain a pre-determined number of color layers of the initial document image.

Figure 9:
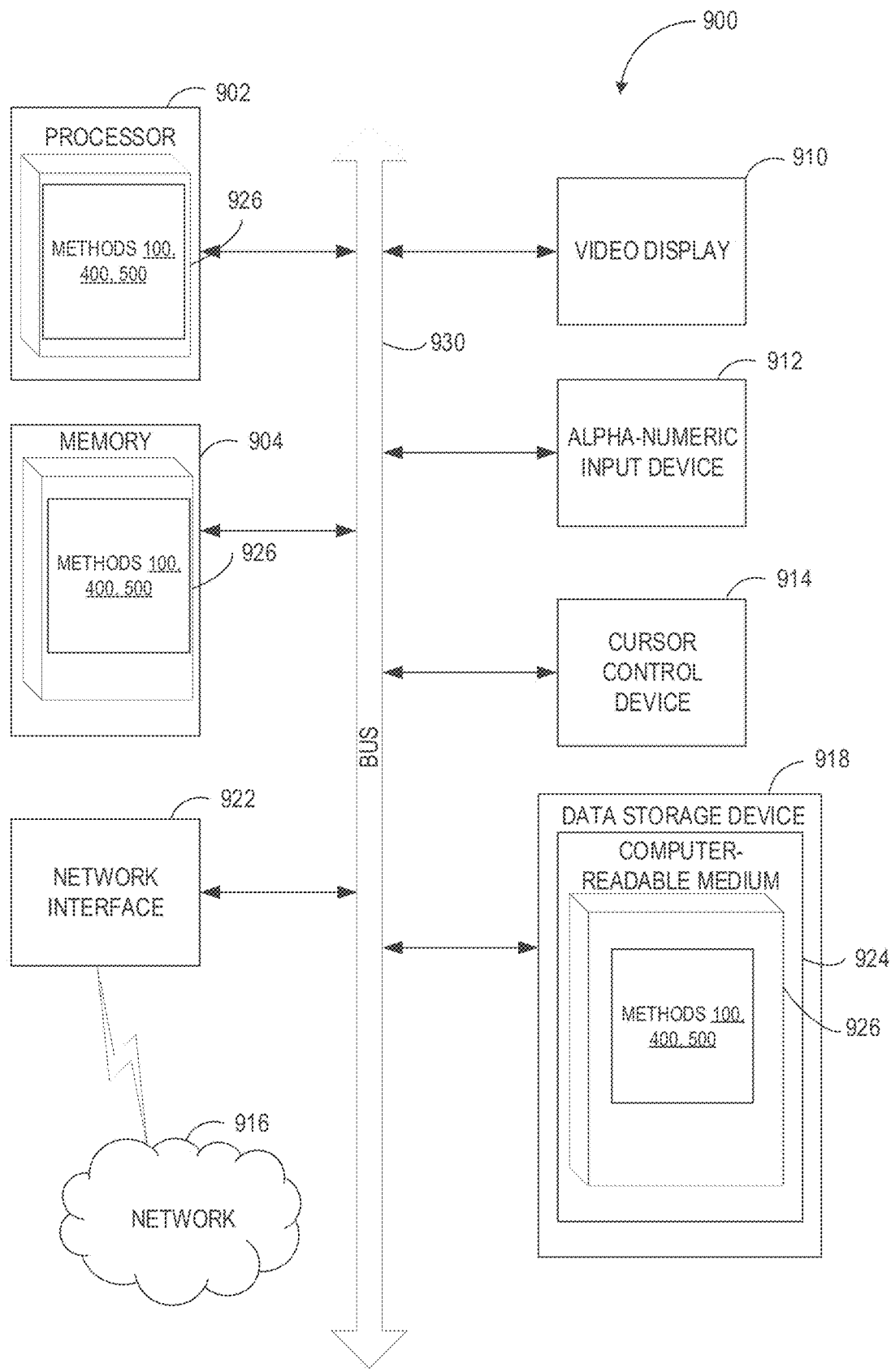
FIG. 9 illustrates a block diagram of a computer system in accordance with some implementations of the present disclosure.

FIG. 9 depicts an example computer system 900 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 900 includes a processing device 902, a main memory 904 (e.g., read-only memory (ROM), flash memory, dynamic random access memory (DRAM) such as synchronous DRAM (SDRAM)), a static memory (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for implementing the methods disclosed herein, such as the method 100 of FIG. 1, method 400 of FIG. 4, and/or the method 500 of FIG. 5 and to perform the operations discussed herein (e.g., operations of methods 100, 400, 500).

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device (e.g., a speaker). In one illustrative example, the video display unit 910, the alphanumeric input device 912, and the cursor control device 914 may be combined into a single component or device (e.g., an LCD touch screen).

The data storage device 918 may include a computer-readable medium 924 on which is stored the instructions 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting computer-readable media. In some implementations, the instructions 926 may further be transmitted or received over a network 916 via the network interface device 922.

While the computer-readable storage medium 924 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
    receiving, by one or more processors, a document image;
    detecting a plurality of connected components in the document image;
    dividing the document image into a plurality of patches, wherein a first patch of the plurality of patches encompasses a first connected component of the plurality of connected components, wherein the first patch is contained within a second patch of the plurality of patches, and wherein the second patch encompasses a second connected component of the plurality of connected components;
    determining, for each patch, whether the patch is monochromatic or polychromatic;
    clustering monochromatic patches of the plurality of patches into a plurality of clusters within a color space, wherein the plurality of clusters comprises a predefined number of clusters, and wherein each cluster corresponds to a color layer of a plurality of color layers of the document image;
    segmenting each polychromatic patch of the plurality of patches into a corresponding plurality of monochromatic segments;
    for each polychromatic patch, associating each monochromatic segment of the corresponding plurality of monochromatic segments with a cluster of the plurality of clusters; and
    utilizing the plurality of clusters for performing an information extraction task on the document image.

2. The method of claim 1, further comprising adjusting one or more properties of the document image and binarizing the document image.

3. The method of claim 1, further comprising collecting statistical data for each patch of the plurality of patches, wherein the statistical data for each patch comprises at least one of a number of pixels, a centroid in the color space, a measure of dispersion, and a measure of skewness.

4. The method of claim 1, wherein clustering the monochromatic patches into the plurality of clusters comprises performing an iterative clustering process.

5. The method of claim 1, wherein each monochromatic segment of the plurality of monochromatic segments corresponds to a respective color layer of the plurality of color layers.

6. The method of claim 1, wherein performing the information extraction task comprises extracting information from each color layer of the document image and combining the information from each color layer in the document image.

7. A system comprising:
    a memory; and
    a processor coupled to the memory, the processor configured to:
        receive a document image;
        detect a plurality of connected components in the document image;
        divide the document image into a plurality of patches, wherein a first patch of the plurality of patches encompasses a first connected component of the plurality of connected components, wherein the first patch is contained within a second patch of the plurality of patches, and wherein the second patch encompasses a second connected component of the plurality of connected components;
determine, for each patch, whether the patch is monochromatic or polychromatic;
clusterize monochromatic patches of the plurality of patches into a plurality of clusters within a color space, wherein the plurality of clusters comprises a predefined number of clusters, and wherein each cluster corresponds to a color layer of a plurality of color layers of the document image;
segment each polychromatic patch of the plurality of patches into a corresponding plurality of monochromatic segments;
for each polychromatic patch, associate each monochromatic segment of the corresponding plurality of monochromatic segments with a cluster of the plurality of clusters; and
utilize the plurality of clusters for performing an information extraction task on the document image.

8. The system of claim 7, wherein the processor is further configured to adjusting one or more properties of the document image comprises and binarize the document image.

9. The system of claim 7, wherein the processor is further configured to collect statistical data for each patch of the plurality of patches, and wherein the statistical data for each patch comprises at least one of a number of pixels, a centroid in the color space, a measure of dispersion, and a measure of skewness.

10. The system of claim 7, wherein clustering the monochromatic patches into the plurality of clusters comprises performing an iterative clustering process.

11. The system of claim 7, wherein each monochromatic segment of the plurality of monochromatic segments corresponds to a respective color layer of the plurality of color layers.

12. The system of claim 7, wherein performing the information extraction task comprises extracting information from each color layer of the document image and combining the information from each color layer in the document image.

13. A non-transitory machine-readable storage medium including instructions that, when accessed by a processing device, cause the processing device to:
receive a document image;
detect a plurality of connected components in the document image;
divide the document image into a plurality of patches, wherein a first patch of the plurality of patches encompasses a first connected component of the plurality of connected components, wherein the first patch is contained within a second patch of the plurality of patches, and wherein the second patch encompasses a second connected component of the plurality of connected components;
determine, for each patch, whether the patch is monochromatic or polychromatic;
clusterize monochromatic patches of the plurality of patches into a plurality of clusters within a color space, wherein the plurality of clusters comprises a predefined number of clusters, and wherein each cluster corresponds to a color layer of a plurality of color layers of the document image;
segment each polychromatic patch of the plurality of patches into a corresponding plurality of monochromatic segments;
for each polychromatic patch, associate each monochromatic segment of the corresponding plurality of monochromatic segments with a cluster of the plurality of clusters; and
utilize the plurality of clusters for performing an information extraction task on the document image.

14. The non-transitory machine-readable storage medium of claim 13, wherein the instructions further cause the processing device to collect statistical data for each patch of the plurality of patches, and wherein the statistical data for each patch comprises at least one of a number of pixels, a centroid in the color space, a measure of dispersion, and a measure of skewness.

15. The non-transitory machine-readable storage medium of claim 13, wherein clustering the monochromatic patches into the plurality of clusters comprises performing an iterative clustering process.

16. The non-transitory machine-readable storage medium of claim 13, wherein each monochromatic segment of the plurality of monochromatic segments corresponds to a respective color layer of the plurality of color layers.

17. The non-transitory machine-readable storage medium of claim 13, wherein performing the information extraction task comprises extracting information from each color layer of the document image and combining the information from each color layer in the document image.

18. The method of claim 1, further comprising:
identifying a first cluster of the plurality of clusters and a second cluster of the plurality of clusters, wherein a distance between a first centroid of the first cluster and a second centroid of the second cluster is a smallest distance between respective centroids of any pair of clusters of the plurality of clusters; and
merging the first cluster and the second cluster.

19. The method of claim 1, further comprising:
performing pairwise merging of clusters of the plurality of clusters until a pre-determined threshold criterion is met.

* * * * *